Figure 1:
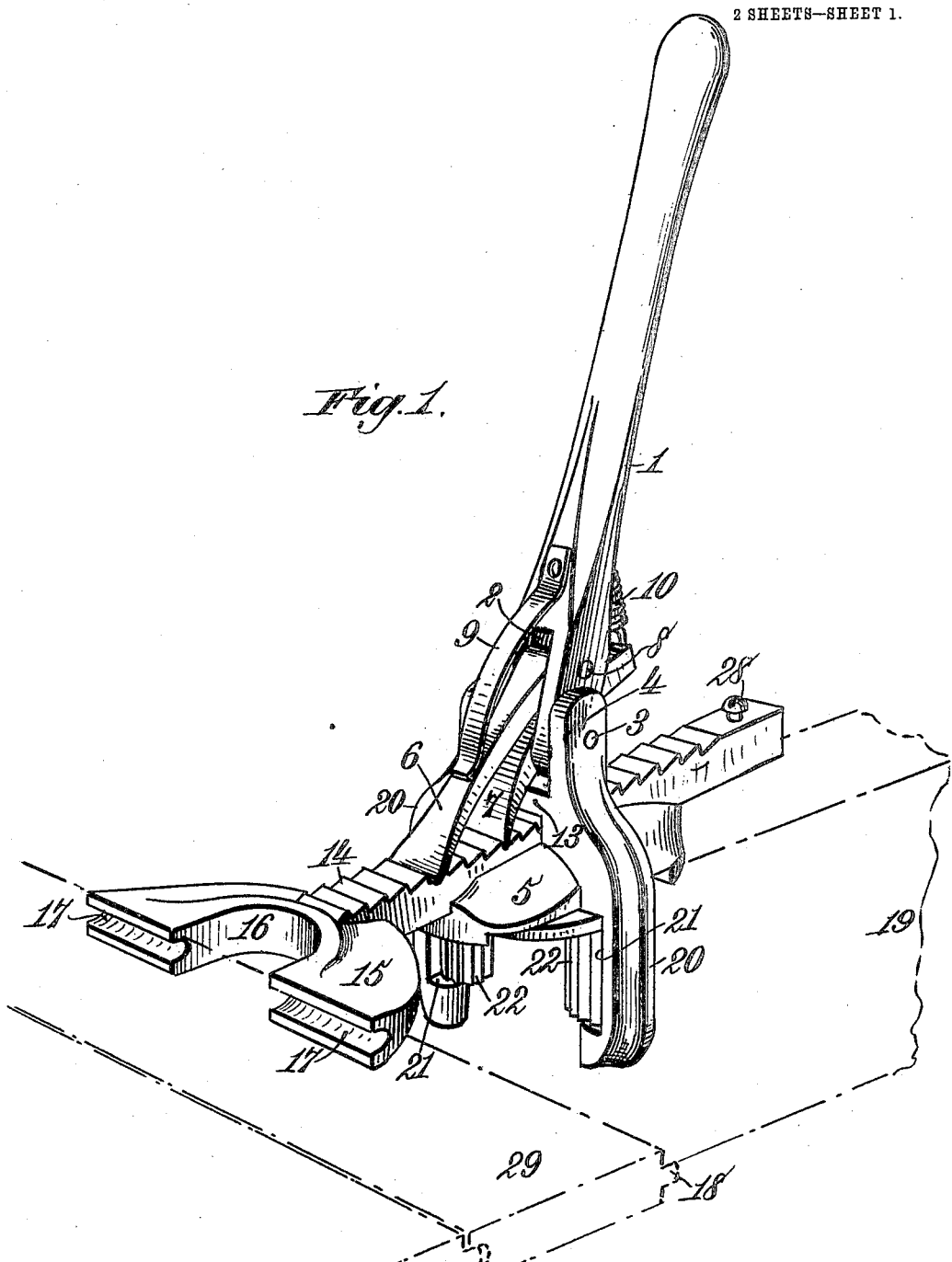

No. 822,093. PATENTED MAY 29, 1906.
I. E. WYER.
CARPENTER'S JACK.
APPLICATION FILED OCT. 26, 1905.

2 SHEETS—SHEET 1.

Witnesses.
Robert Everett,
C. D. Kesler

Inventor:
Ira E. Wyer.
By Bruce A. Elliott
Atty.

No. 822,093. PATENTED MAY 29, 1906.
I. E. WYER.
CARPENTER'S JACK.
APPLICATION FILED OCT. 26, 1905.
2 SHEETS—SHEET 2.
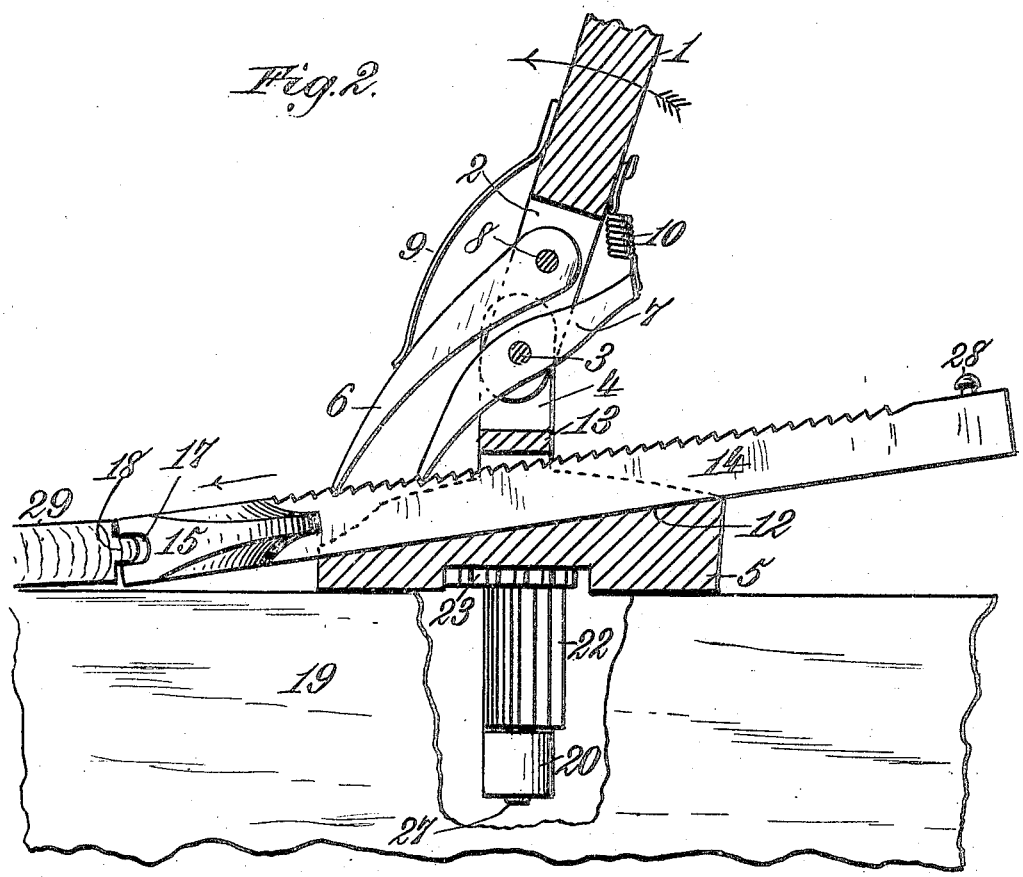
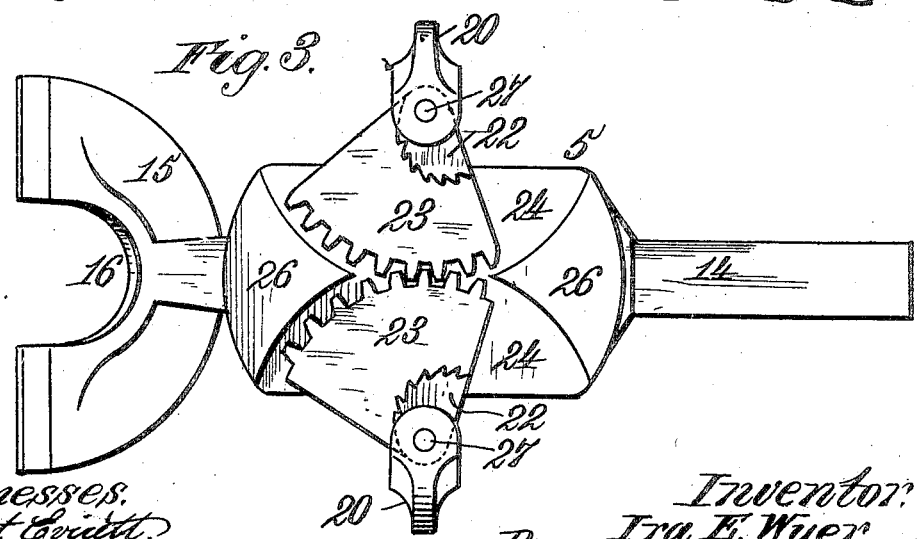
Witnesses.
Robert Everitt,
C. D. Kesler
Inventor.
Ira E. Wyer.
By Bruce A. Elliott,
Atty.

UNITED STATES PATENT OFFICE.

IRA E. WYER, OF PORTSMOUTH, OHIO.

CARPENTER'S JACK.

No. 822,093.　　　Specification of Letters Patent.　　　Patented May 29, 1906.

Application filed October 26, 1905. Serial No. 284,572.

*To all whom it may concern:*

Be it known that I, IRA E. WYER, a citizen of the United States, residing at Portsmouth, in the county of Scioto and State of Ohio, have invented new and useful Improvements in Carpenters' Jacks, of which the following is a specification.

This invention relates to certain new and useful improvements in a device for use by carpenters in forcing matched boards into position, as in laying flooring or in other similar applications.

The invention has for its objects to provide a device of this character which may be used with ease and facility, which shall possess strength and reliability in operation and which shall be simple in construction and economical to manufacture.

Detailed objects of the invention, whereby the above-stated advantages are obtained, will be more clearly understood from the detailed description to follow.

In order that the invention may be clearly understood, I have illustrated the same in the accompanying drawings, in which—

Figure 1 is a perspective view of the device, showing the same in position for use. Fig. 2 is a broken transverse sectional view, and Fig. 3 is a bottom plan view.

Referring now to the drawings, 1 indicates the operating lever or handle, which is bifurcated at its lower end, as indicated by 2, and is pivotally mounted at such lower end by means of a pivot-pin 3 between standards 4, extending from a block or base 5. Pivotally mounted in the bifurcated portion of the handle are two dogs 6 and 7, respectively, the dog 6 being mounted at its inner end on a pivot-pin 8 and the dog 7 intermediate its ends on the pin 3, on which the handle is mounted. In operation the dog 6 is held to its work by means of a leaf-spring 9, mounted at one end on the handle 1 and having its free end slidably engaging the outer edge of the dog 6, while the dog 7 is held to its work by means of a coiled spring 10, secured at one end to the handle and at its other end to the rearwardly-projecting end of the dog 7. The base 5 is provided on one side with a guideway or groove 11, the bottom of which is inclined, as indicated at 12, said groove serving, in connection with a cross-bar 13, connecting the standards 4, as a housing and guide for a rack-bar 14, the teeth of which are engaged by the dogs 6 and 7. Said rack-bar is provided on its outer end with a semicircular head 15, provided with a central recessed portion 16, the outer straight edge of said head being grooved longitudinally, as indicated at 17, to receive the tongue 18 of a board. The recess 16 is for the purpose of permitting the head 15 to engage a board on opposite sides of a sleeper, as 19, as will be clearly understood. On the side of the base 5 opposite to that having the standards 4 there project claws 20, located at opposite edges of said base, each of which claws is provided with a recess 21, in which is eccentrically and pivotally mounted a corrugated gripping member or cam 22, the space between said gripping-cams being sufficient for the reception edgewise of a sleeper of the ordinary width used in floor construction. The gripping-cams 22 are connected to or formed integral at their upper ends with two intermeshing segment-gears 23, which work in circular recesses 24, formed in the outer face of the base 5, leaving projecting portions 26 of the base to rest upon the sleeper, and thus hold the segment-gears out of contact therewith. The purpose of the segment-gears is to insure the simultaneous and uniform movement of the gripping-cams, and the pivot common to each cam and gear is indicated at 27.

The rack-bar 14 may be provided at its rear end with a screw 28, the head of which is left projecting to prevent said rack-bar from falling out of the base.

The operation of the device is as follows: A board 29 being placed in position on the sleepers 19 to have its groove engage the tongue of a previously-laid board, my device is brought into position, so that the head 15 will engage the outer edge of said board, as indicated in the drawings. In this position the parts 26 of the base will rest upon the top of a sleeper, while the gripping-cams 22 will be on opposite sides of the latter and in frictional contact therewith. The handle is now moved in a direction toward the board 29. This movement will carry the dog 6 in a similar direction, and as said dog has its outer end held in engagement with the teeth of the rack-bar 14 the latter will also be moved forward or toward the board 29. As the base 5 serves as the fulcrum for the handle 1, the above operation will cause said base to be forced away from the board, which movement will cause the gripping-cams 22 to rotate and, due to their eccentric mounting, more firmly grip the sides of the sleeper 19 until they arrest the movement of the base. As the handle 1 is moved forward the spring 10 will be extended, exerting a yielding force on the dog 7 to hold its free end in engagement with the rack-bar 14, while permitting the forward movement of the latter. In the backward movement of the handle the dog 6 will be drawn over one or more teeth of the rack-bar, while the dog 7, having the same pivot as the handle, will not be moved and will operate to hold the rack-bar in the position to which it has been forced by the dog 6, the handle never being moved backward a sufficient distance to permit the spring 10 to entirely retract, and thus cease to exert a pull on the rear end of the dog 7. In practice the handle is rapidly moved back and forth through a small arc a few times and the board 29 will be quickly forced into position. The handle may then be released and the board will be held in position while the nails are being driven. By forming the bottom of the guide-groove for the rack-bar inclined said rack-bar in operation will force the outer edge of the board 29 downward into contact with the sleeper, as will be clearly apparent from an inspection of Fig. 2.

For the sake of brevity I will refer to the dog 6 in the claims as "forcing-dog" and the dog 7 as a "holding-dog."

Having thus fully described my invention, what I claim as new, and desire to secure by Letters Patent, is—

1. A carpenter's jack comprising a base, a rack-bar slidably mounted therein in an inclined position, a forcing and a holding dog coöperating with said rack-bar, and means for operating said dogs.

2. A carpenter's jack comprising a base, a rack-bar slidably mounted therein, an operating-lever, a forcing-dog pivotally mounted on said lever, a holding-dog, a pivot-pin in said base common to said holding-dog and lever, and springs carried by said lever for controlling the action of said dogs.

3. A carpenter's jack comprising a base, a rack-bar slidably mounted therein in an inclined position, an operating-lever pivotally mounted in said base, a forcing-dog pivotally mounted on said lever, a holding-dog pivotally mounted intermediate its ends on the pivot of said lever, and springs operating to hold said dogs normally in engagement with the teeth of said rack-bar.

4. In a carpenter's jack, in combination with the base, a pair of intermeshing gears rotatably mounted on the base, and a gripping member carried by each gear.

5. In a carpenter's jack, in combination with the base, a pair of intermeshing gears rotatably mounted on the base, and a pair of eccentrically-mounted gripping members carried, respectively, by said gears.

6. In a carpenter's jack, in combination with the base, a pair of intermeshing gears rotatably mounted on the base, and a pair of eccentrically-mounted, corrugated, gripping members carried, respectively, by said gears.

7. In a carpenter's jack, in combination with a base provided with recesses; a pair of intermeshing gears rotatably mounted in said recesses, and a gripping-cam carried by each gear.

In testimony whereof I have hereunto set my hand in presence of two subscribing witnesses.

IRA E. WYER.

Witnesses:
LOUISE W. MILLAR,
EDGAR G. MILLAR.